H. T. McCLURE & J. J. HEYS.
WELT INDENTING MACHINE.
APPLICATION FILED JUNE 5, 1911.
1,173,364.
Patented Feb. 29, 1916.
3 SHEETS—SHEET 1.
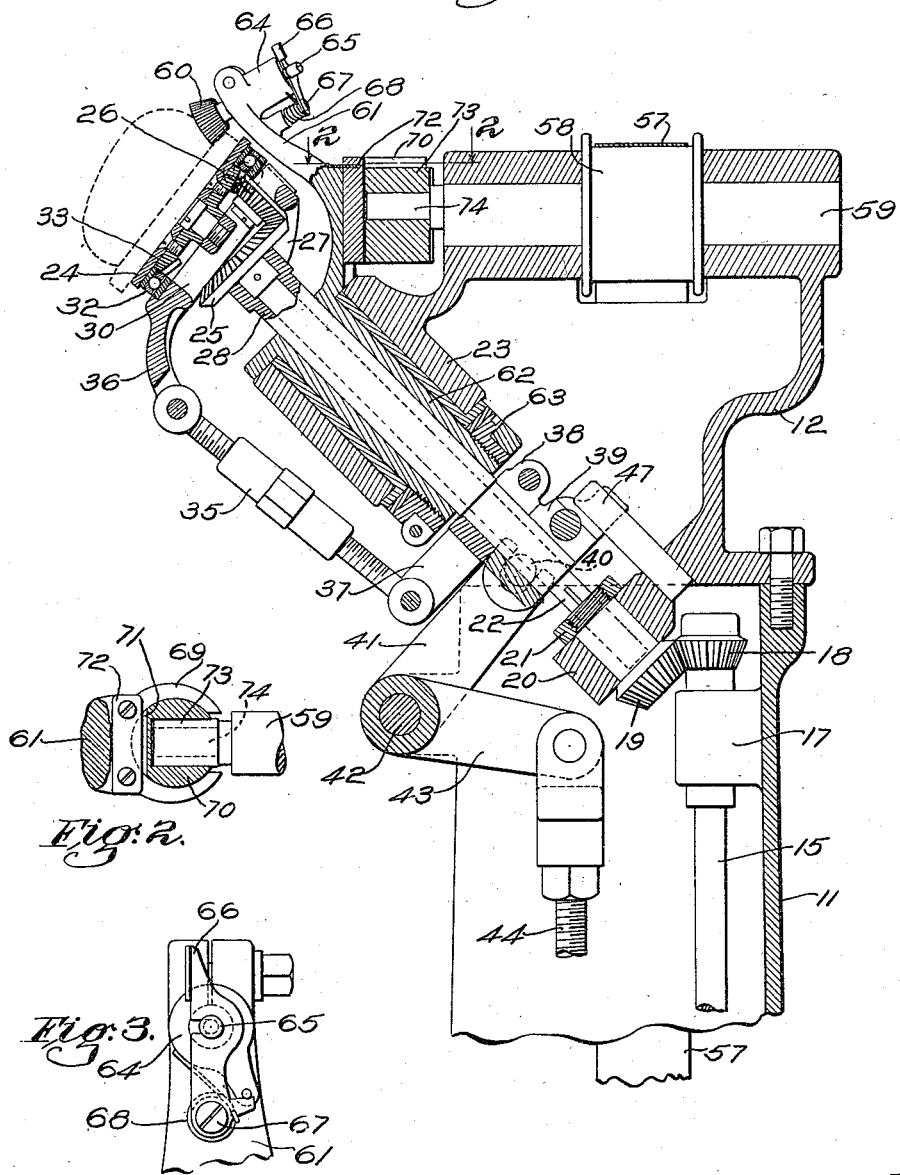
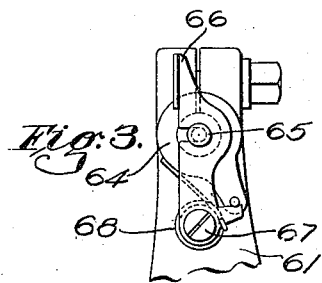
Witnesses:
Roswell F. Hatch
Warren G. Ogden
Inventors
John J. Heys
Harry T. McClure
by Phillips Van Everen & Fish
Attys
THE COLUMBIA PLANOGRAPH CO., WASHINGTON, D. C.

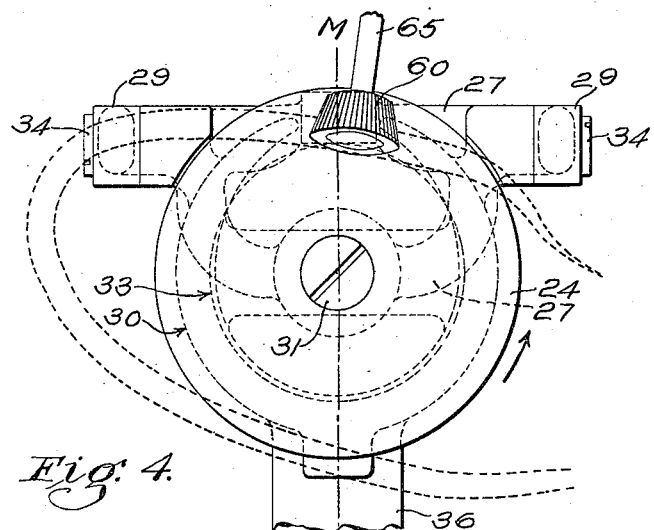
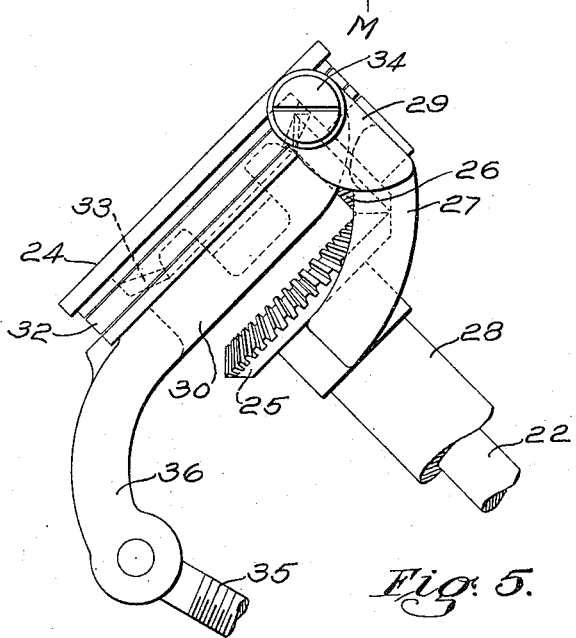

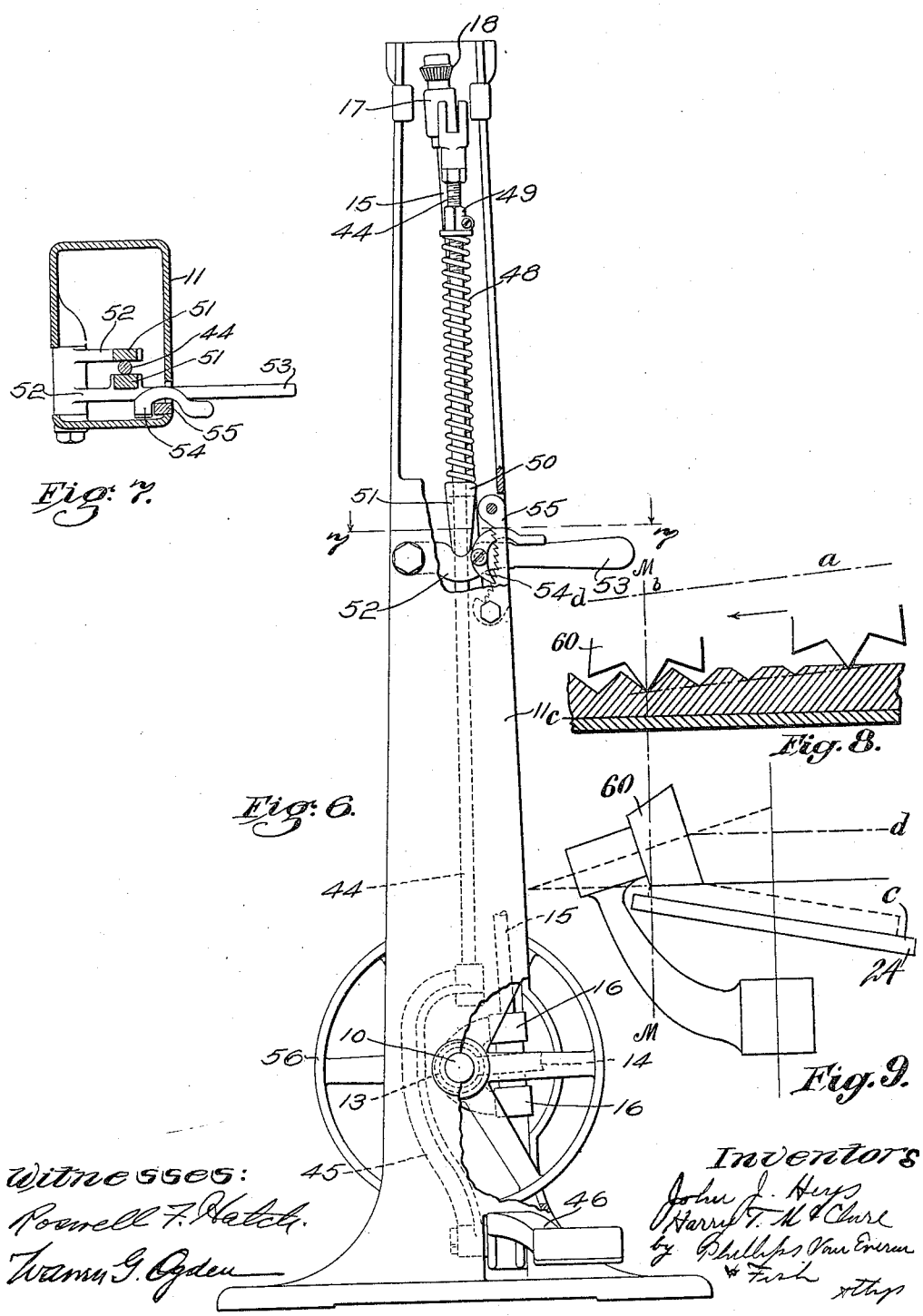

UNITED STATES PATENT OFFICE.

HARRY T. McCLURE, OF BOSTON, AND JOHN J. HEYS, OF LYNN, MASSACHUSETTS, ASSIGNORS TO UNITED SHOE MACHINERY COMPANY, OF PATERSON, NEW JERSEY, A CORPORATION OF NEW JERSEY.

WELT-INDENTING MACHINE.

1,173,364.  Specification of Letters Patent.  Patented Feb. 29, 1916.

Application filed June 5, 1911.  Serial No. 631,395.

*To all whom it may concern:*

Be it known that we, HARRY T. McCLURE and JOHN J. HEYS, both citizens of the United States, residing at Dorchester Station, Boston, county of Suffolk, State of Massachusetts, and Lynn, in the county of Essex and State of Massachusetts, respectively, have invented certain new and useful Improvements in Welt-Indenting Machines; and we do hereby declare the following to be a full, clear, and exact description of the invention, such as will enable others skilled in the art to which it appertains to make and use the same.

This invention relates to welt indenting machines and more particularly to machines of this kind which are known as burnishing or finishing machines although the present machine may be used for initially impressing or indenting a welt if so desired.

The present machine is an improvement upon the machine illustrated and described in Letters Patent of the United States No. 860,377, issued July 16, 1907, upon an application of one of the present inventors, and the objects of the present invention are to improve the construction and operation of that machine.

These objects will be best understood by a description of the various features of the invention which, in their best form at present known to the inventors, are illustrated in the accompanying drawings.

To these ends the invention comprises the features and combinations of parts, as will be readily understood by those skilled in the art, hereinafter described and then particularly pointed out in the appended claims.

Referring to the drawings, Figure 1 is a central, longitudinal section through the head of the machine; Fig. 2 is a detail in plan and partly in section of the duplex joint for oscillating the tool on the line 2—2, Fig. 1; Fig. 3 is a detail of the latch for retaining the tool within its bearing on the carrier; Fig. 4 is a plan of the work table showing also the relative position of the tool to the vertical median line of the work table; Fig. 5 is an elevation of the work table and the frame by which it is tipped relative to the tool; Fig. 6 is an elevation, partly broken away to show hidden parts, of the column forming the base of the frame; Fig. 7 is a transverse section on the line 7—7, Fig. 6; Fig. 8 is a diagrammatic view, greatly enlarged, illustrating the position of the tool, in the impressions or indentations made thereby in the welt, at the end of its stroke in the direction of the feed of the work, this figure being connected to Fig. 9 by a center line thrugh the tool. Fig. 9 is a diagrammatic view exaggerated illustrating the movement of the tool with relation to the plane of the face of the table when the tool is exerting a hammering action upon the work.

In the illustrated embodiment of the invention and referring first to Fig. 6, the driving shaft 10, having a pulley (not shown) at its rear end by which it may be connected to a suitable source of power, is mounted at the base of a column 11. At the top of this column is a frame 12 (Fig. 1) which supports the work table and indenting tool. The driving shaft 10 is provided with a worm 13 which drives a worm gear 14 (dotted lines Fig. 6) mounted on the lower end of a rotary shaft 15 which extends upward through the column 11 and is journaled in suitable bearings 16 and 17 carried by the column at the upper and lower end of the shaft, respectively. This construction is similar to the patented construction except that the shaft is now mounted within the column. The shaft 15 has fixed to its upper end a beveled gear 18 (Fig. 1), which meshes with a beveled gear 19 having a hub journaled in a portion 20 of the frame 12, which projects downward therefrom within the upper end of the column 11. The beveled gear 19 is held within its journal by means of a nut 21 threaded on the end of its hub. The beveled gear 19 is splined, for a purpose presently to be described, to the lower end of the work table spindle 22 (Fig. 1), which extends upwardly and is journaled within a bearing 23 at the front of the frame 12, which bearing is arranged at an acute angle to the horizontal. With this manner of supporting the work table spindle 22, the work table 24, which is mounted at the upper, or outer, end of the spindle, has its work supporting surface also at an acute angle to the horizontal and is thus enabled to support the shoe in a position where the welt may readily be seen by the operative as the shoe is fed through the machine. This is highly important and distinctly advantageous over the arrangement shown in the patent No. 860,377 hereinbefore referred to, as the present arrangement permits the operative to present the shoe to the tool, and to handle it while being operated on, with greater ease, by reason of which advantages the speed of operation may be greatly increased.

In the operation of the machine, the work table spindle 22 is rotated by means of its operative connections to the driving shaft 10 and the purpose of this rotation is to impart a rotary movement to the work table so that it will feed the work. To this end suitable means, now to be described, are interposed between the upper end of the spindle and the work table through which the rotary movement of the spindle may be transmitted to the table. A beveled gear 25 is pinned to the outer end of the spindle 22 and this gear meshes with an idle beveled gear 26 loosely journaled in a bracket 27 (Figs. 1, 4 and 5), which is carried at the upper end of a non-rotatable sleeve 28 which surrounds the spindle 22 and extends downwardly through the bearing 23. The purpose of this sleeve will presently be made clear. The bracket 27 is provided with a pair of upwardly extending arms 29 which are provided with bearings, the axes of which are perpendicular to the axis of the spindle 22, and in these bearings there is pivoted a table supporting frame 30 on which the table is freely rotatable about a central pivot 31 connecting it to its support. A ball bearing runway 32 (Fig. 1), of any suitable and convenient construction, is interposed between the table 24 and its supporting frame, thus providing an anti-friction bearing for the table. The table has also secured to its underside a beveled gear 33 which meshes with the idle gear 26 supported in the bracket 27. It will be seen that with this construction, the rotary movement imparted to the spindle 22 from the driving shaft is transmitted through the train of beveled gears 25, 26 and 33 to the table which is thus continuously rotated in a direction to feed the work.

The reason for mounting the table upon the pivoted frame 30 permitting the table to be tipped relative to the tool is to provide the proper angle between the face of the table and the operating face of the tool to accommodate the soles of various styles of shoes. As is well known to those skilled in the art, some shoes have sole extensions to be indented which taper considerably toward the edge of the sole whereas in other styles of shoes the taper may be greater or less or in the opposite direction, or the surface of the welt may be substantially parallel to the tread face of the sole. By mounting the work table in the tipping frame it may be adjusted angularly to meet these varying conditions so as to provide for the best work. This adjustment is also used to provide for a greater depth of impression at either the inner or outer edge of the welt as may be desired. It will be noted that the axes of the pivots 34 (Figs. 4 and 5), about which the table frame is tipped in the bracket 27, pass through the lines of engagement of the gears 26 and 33 so that under any usual or desired angular adjustment of the table these gears are not thrown out of mesh and the rotation of the table to feed the work is, therefore, unaffected. A simple means for adjusting the frame 30 to tip the table has been found to comprise a turnbuckle 35 (Fig. 1), the two threaded ends of which are pivotally connected respectively to a lug 36 extending forwardly and downwardly from the frame 30 and a lug 37 extending forwardly from a split collar 38 secured to the sleeve 28 below the bearing 23.

The purpose of the splined connection of the spindle 22 to the hub of the gear 19, and of the sleeve 28 which surrounds the spindle will now be explained. With machines of this character it is quite common, as in the present case, to maintain the work support yieldingly pressed toward the tool, for a purpose well known to those skilled in the art, and under these conditions the work table should be mounted so that it may be raised and lowered relative to the tool to permit the insertion and removal of the work. It is important, when the table is raised and lowered, that its angular adjustment be not disturbed as this obviates a readjustment of the table to secure the proper angle of tip each time that new work of the same character as that previously operated on is presented to the tool. Means is, therefore, provided in the present machine through which the table may be raised and lowered relative to the tool without altering its angular adjustment. It is also important that the rotation of the table to feed the work be uninterrupted while it is raised and lowered, that is, that such a movement of the table may be permitted to take place without stopping the machine. This is also provided for in the present table raising and lowering means. The sleeve 28 has secured thereto, below the collar 38, a second split collar 39 (Fig. 1) carrying a transversely projecting pin 40 which is engaged by the forked end of the upper arm 41 of a bell-crank lever fulcrumed on a pin 42 at the front of the column 11. The lower arm 43 of the bell-crank lever is pivotally connected to the upper end of a vertical rod 44 (Figs. 1 and 6) extending downwardly within the column 11 and connected by means of a suitable casting 45 with a foot treadle 46 fulcrumed at its rear end in the base of the column 11.

Assuming that the work table is in the position shown in Fig. 1, on depressing the foot treadle 46 the bell crank is moved in a direction to pull the sleeve 28 downwardly within the bearing 23. As this sleeve carries the table tipping means and the means for rotating the table to feed the work, a downward movement of the sleeve also carries with it the table spindle 22 which is permitted to partake of this movement by reason of its splined connection to the gear 19. A guide pin 47 is fixed in a hole in the part 20 of the frame and projects upwardly parallel to the spindle 22, being engaged at its upper end by a slot in a rearward extension of the collar 39. This construction permits a lengthwise movement of the sleeve 28 on the spindle 22 but prevents its rotation thereon.

The means for yieldingly holding the table in its working position comprises a coiled spring 48 surrounding the vertical rod 44 and sustained between an upper fixed collar 49 and a lower adjustable collar 50. The lower collar 50 is provided with a pair of depending legs 51 (Figs. 6 and 7) extending along the rod and having rounded ends which are seated in sockets (see Fig. 6) formed in the two parallel arms of a two-armed lever 52 fulcrumed in the column 11 below the collar 50. One arm of the two-armed lever 52 is provided with a handle 53 which projects outwardly from the column 11 at a convenient point to be seized by the operative. A latch 54 having a suitable thumb piece is mounted upon the handle. Within the column 11 there is provided a toothed bar 55 with which the latch 54 is adapted to engage and hold the lever in any position of adjustment. With this means on seizing the handle and disengaging the latch 54 from the toothed bar 55, the lever 52 may be raised or lowered about its pivot thus varying the distance of the collar 50 from the collar 49 and increasing or decreasing the tension of the spring 48 as may be desired. At all times, however, the spring 48 acts against the collar 49 to maintain the work table in its highest position and the treadle 46 raised. This construction provides an extremely simple and efficient means for quickly varying the tension of the table supporting spring.

The driving shaft 10, in addition to carrying the worm 13, has also secured thereon a pulley 56 (Fig. 6) which, by means of a belt connection 57 (Fig. 1), drives a pulley 58 which is fixed to a rotary shaft 59 journaled in horizontal bearings at the top of the frame 12. The rotation of this shaft is employed to impart a movement to the welt indenting tool 60 back and forth across the table. Preferably the tool is given an oscillatory movement in a curved path extending about the axis of the work table as in the machine of the Patent No. 860,377, hereinbefore referred to. To this end the tool is sustained in a carrier 61 which is mounted to swing about the table spindle 22 as a pivot. This is accomplished by providing the tool carrier 61 with a depending sleeve or bearing 62 which extends downward through the bearing 23 of the frame 12 and surrounds the sleeve 28. The means by which the tool carrier 61 is secured within the bearing 23 is clear from an inspection of Fig. 1, in which 63 indicates any suitable form of thrust bearing. As seen by Fig. 1, while the sleeve 28 is movable longitudinally within the bearing 23, the sleeve 62 of the tool carrier 61 is held from longitudinal movement.

It will be convenient to describe now the manner in which the tool is mounted in its carrier. At the upper end of the tool carrier 61 there is provided a bearing 64 within which the shank 65 of the tool 60 is journaled and on which the tool is freely rotatable. The shank 65 is held within the bearing 64 by means of a spring pressed latch plate 66 (Fig. 3). The tool shank 65 at its rear end is provided with one or more annular grooves and the latch plate 66 is provided with a recess in one side, the width of which is substantially the diameter of the tool shank at the base of the groove. The latch plate is pivoted at 67 and a torsional spring 68 acts in a direction to cause the plate to engage the shank of the tool, as shown in Fig. 3. The latch plate may, however, be disengaged from the tool shank at any time to permit an interchange of tools. The tool 60 may be adjusted endwise within the bearing 64 by causing the latch plate 66 to engage with one or another of the annular grooves in the shank of the tool.

Referring now to Figs. 1 and 2, the means for oscillating the tool carrier with its tool about the spindle 22 as a pivot will be described. Owing to the angular relation of axis about which the tool carrier oscillates and the axis of the rotary shaft 59 by which it is driven, it has been found neccessary to provide what may be termed a duplex joint between the rotary shaft and carrier in order to permit the carrier to move freely about its pivot. The duplex joint referred to comprises a circular guide sleeve 69 (Fig. 2) at the rear of the tool carrier 61, which sleeve has mounted within it a cylindrical block 70. The block 70 is provided with a slot 71 toward its top and a plate 72 mounted on the tool carrier projects into this slot so that the cylindrical block is prevented from vertical movement within the guide 69 although sufficient clearance is provided to permit a relative rotation between the block and guide. The block 70 is provided with a vertical slot in which is seated a slide block 73 vertically movable within the block 70. This vertical movement is obtained from a crank pin 74 on the end of the rotary shaft 59 which has a bearing in the slide block 73. The circular guide 69 is provided with an opening at its side toward the rotary shaft to permit a passage of the crank pin through it, and also provide sufficient clearance commensurate with the extent of the oscillations of the guide 69 relative to the slide block. Clearance space is also provided between the inner end of the slide block 73 and the wall of the cylindrical block 70 to take care of the downward movement of the tool carrier. With this construction as the crank pin 74 moves in its circular path the slide block 73 is moved transversely, which movement is transmitted to the circular guide 69 to move the tool carrier transversely, or about its pivotal point. Owing to the fact, however, that the plane of oscillation of the carrier and of the tool, is at an acute angle to the plane of movement of the crank pin, the parts would bind unless the cylindrical block 70 were interposed between the slide block and the circular guide to take up the twist which otherwise would be exerted upon the crank pin when the tool travels downwardly relative to the axis of the rotary shaft 59 in its movement, that is, out of a horizontal plane.

Instead of mounting the tool as in the Patent No. 860,377, hereinbefore referred to, so that its oscillatory movement carries it to each side of the vertical median line of the work table, in the present machine the tool is so mounted that its movement is confined to a space at the advance side of said median line (see Fig. 4). This is extremely important as with such a movement of the tool a hammering or pounding action upon the work is obtained. This may be explained, with the aid of Figs 8 and 9, as follows. In order to prevent the oscillations of the tool carrier from carrying the tool across the vertical median line M—M (Figs. 4 and 8) of the work table, the tool carrier 61 has its upper end offset to the right, so that the tool drives up to and away from the vertical median line M—M to the right thereof during its oscillation. In practice the extent of travel of the tool substantially between the points a, b, shown in Fig. 8, of course, in proper proportion and in a curved path substantially concentric with the table axis. The tool is set with its work-engaging face at right angles to the axis of the tool carrier 62 so that the oscillations of the tool carrier will move the work engaging face of the tool back and forth across the table in a plane. With the table tipped as shown in Fig. 1, the plane generated by the work-engaging face of the tool will form a rectilinear angle to the plane of the surface of the table, the nearest approach of the tool to this plane being at the end of its stroke in the direction of the feed of the work. This may be seen from Figs. 8 and 9 wherein the full line c indicates the surface of the work table and the dot and dash line d indicates the line of travel of the center of the tool. If the work supporting surface of the table were parallel to the plane of movement of the working face of the tool, the lines c and d would be parallel but because of the angle between these two planes, the path of movement of the working face of the tool, that is, the line d, is at an angle to the plane of the surface of the table. Because of this, the tool will act to bite into the welt more deeply just at the end of its stroke. This is indicated in Fig. 8, the arrow showing the direction of feed. As the oscillation of the tool above the table is very rapid compared with the feed of the work, the continued series of movements of the tool toward the table, as explained, has the effect of pounding or hammering the welt, thus compacting the leather and giving the indentations a high finish, as is desirable.

In the following claims all references to position or direction of movement of the elements are to be interpreted as terms of designation and not of limitation, as obviously it is the relative position or relative direction of movement which alone is of importance.

Nothing herein contained is to be interpreted as limiting this invention in the scope of its application to use in connection with the particular type of machine which has been selected for purposes of illustration and explanation. While the particulars of construction herein set forth are well suited to one mechanical form of the invention, it is not to be understood that these particulars are essential since they may be variously modified within the skill of the artisan without departing from the true scope of the actual invention as defined by the following claims.

What is claimed as new, is:—

1. A welt indenting machine, having, in combination, a work table mounted with its work supporting surface arranged at an angle to the horizontal to support the shoe in a position where the welt may readily be sent by the operator, a horizontal, rotary driving shaft, a welt indenting tool above the table, a tool carrier mounted to swing about a pivot having its axis at an acute angle to the axis of said shaft, and connections between said shaft and tool carrier for oscillating said carrier with its tool freely about its pivot, by the rotation of said shaft, substantially as described.

2. A welt indenting machine, having, in combination, a work table mounted with its work supporting surface arranged at an angle to the horizontal to support the shoe in a position where the welt may readily be seen by the operator, a horizontal, rotary driving shaft, a welt indenting tool above the table, a tool carrier mounted to swing about a pivot having its axis at an acute angle to the axis of said shaft, a circular guide sleeve at the rear of said carrier, a cylindrical block carried by said sleeve and mounted for relative angular movement only to the guide, a slide block vertically movable in said cylindrical block and a crank pin on the end of said shaft projecting through an opening in the guide sleeve and into the slide block, by virtue of which connection the carrier with its tool may be oscillated freely about its pivot by the rotation of said shaft, substantially as described.

3. A welt indenting machine, having, in combination, a work table, a welt indenting tool above the table, a rotary operating shaft, a tool carrier pivoted on an axis at an acute angle to the axis of said shaft, a crank pin in the end of said shaft and a duplex joint connecting said pin and carrier permitting said shaft to impart free oscillation to the carrier with its tool about its pivot, substantially as described.

4. A welt indenting machine, having, in combination, a work table, an oscillating welt indenting tool above the table, a rotary shaft having a crank pin on its end, and operative connections between said pin and tool for freely oscillating the work engaging face of the tool in a curved path in a plane at an acute angle to the axis of the shaft, substantially as described.

5. A welt indenting machine, having, in combination, a work table mounted with its work supporting surface arranged at an angle to the horizontal to support the shoe in a position where the welt may readily be seen by the operator, a horizontal, rotary driving shaft, a welt indenting tool above the table, a spindle for said table extending downwardly at an acute angle to the line of said shaft, means to move the spindle in the line of its axis to raise and lower the work table, and means controlled by said shaft for freely oscillating said tool about the axis of the table spindle as a center, substantially as described.

6. A welt indenting machine, having, in combination, a work table, a welt indenting tool mounted to project over the table and at one side of its vertical median line, and means to oscillate the tool in a path partly encircling the axis of the table, said oscillations being of such an extent as to carry the tool toward and from said median line but never crossing it, substantially as described.

7. A welt indenting machine, having, in combination, a rotatable work table, a welt indenting tool mounted to project over the table, and means to reciprocate the work engaging face of the tool in the line of feed, said tool and its operating means being constructed and arranged so as to confine said reciprocatory movement to a single plane and to the space at the advance side of the vertical median line of the table, substantially as described.

8. A welt indenting machine, having, in combination, a work table, a rotatable welt indenting tool, a welt indenting tool carrier mounted for movement across the table, a driving shaft, and connections between the driving shaft and welt indenting tool carrier for moving the tool carrier in a path to cause the work engaging face of the tool to travel in a plane at an acute angle to the axis of said driving shaft, substantially as described.

9. A welt indenting machine, having, in combination, a work table, a welt indenting tool mounted to project over the table, and means for moving the work engaging face of the tool back and forth across the table in a plane forming a rectilinear angle with the plane of the surface of the table, whereby the tool is nearer the table at one end of its stroke than it is at the other end, substantially as described.

10. A welt indenting machine having, in combination, a rotatable work table, a welt indenting tool mounted to project over the table, and means for moving the work-engaging face of the tool back and forth in a curved path having an axis substantially concentric with the table axis, which path and the surface of the table converge on the forward stroke of the tool whereby the tool reciprocations tend to pound or hammer the indentations.

11. A welt indenting machine, having, in combination, a work table, a welt indenting tool mounted to project over the table, a rotary spindle for the table, means carried by the spindle adapted to rotate the table to feed the work, adjusting means wholly supported by the spindle for tipping the table to vary its angle relative to the tool, and means for raising and lowering the spindle and table tipping means relative to the tool without altering the adjustment of the table or stopping its rotation, substantially as described.

12. A welt indenting machine, having, in combination, a welt indenting tool, a rotary spindle carrying a bevel gear at its upper end and a bracket sustaining an idle gear meshing with the spindle gear, a frame pivoted in said bracket in bearings perpendicular to the axis of the spindle, a work table pivoted in said frame having a bevel gear on its under side meshing with said idle gear, a sleeve on the spindle carrying said bracket, means carried by said sleeve for tipping the frame and table relative to the tool, and means for raising and lowering the sleeve and spindle bodily relative to the table, substantially as described.

13. A welt indenting machine, having, in combination, a welt indenting tool, a work table below the tool, means for tipping the table relative to the tool, means for rotating the table to feed the work, and a single means for raising and lowering the work table and its tipping means relative to the tool while maintaining the angular relation of the table and tool unchanged, substantially as described.

14. A welt indenting machine, having, in combination, a welt indenting tool, a work table below the tool mounted for both rotary and tipping movement relative to the tool, a rotary spindle, means intermediate the spindle and table for rotating the table to feed the work, means for tipping the table, and means connected to the table tipping means for raising and lowering said means and table bodily relative to the tool while maintaining the angular relation of the table and tool unchanged, substantially as described.

15. A welt indenting machine, having, in combination, a welt indenting tool, a work table below said tool, means for yieldingly supporting said table including a coiled spring sustained on a vertical rod between end collars, and means to vary the position of one of said collars on its rod to vary the tension of the spring comprising legs on the collar extending along the rod and having rounded ends, a horizontal, pivoted, two-armed lever having sockets in which said legs are seated by the spring, a handle for moving the lever and collar, and a latch device for retaining the lever and spring in its adjusted position, substantially as described.

HARRY T. McCLURE.
JOHN J. HEYS.

Witnesses:
HARRY C. FARRELL,
CHESTER E. ROGERS.

Copies of this patent may be obtained for five cents each, by addressing the "Commissioner of Patents, Washington, D. C."

It is hereby certified that in Letters Patent No. 1,173,364, granted February 29, 1916, upon the application of Harry T. McClure, of Boston, and John J. Heys, of Lynn, Massachusetts, for an improvement in "Welt-Indenting Machines," an error appears in the printed specification requiring correction as follows: Page 4, line 121, claim 1, for the word "sent" read *seen;* and that the said Letters Patent should be read with this correction therein that the same may conform to the record of the case in the Patent Office.

Signed and sealed this 21st day of March, A. D., 1916.

[SEAL.]

J. T. NEWTON,

*Acting Commissioner of Patents.*

Cl. 12—41.